United States Patent
Gu et al.

(10) Patent No.: US 10,715,011 B2
(45) Date of Patent: Jul. 14, 2020

(54) ELECTRICAL MACHINE WITH COOLED BUSBARS

(71) Applicant: Karma Automotive, LLC, Irvine, CA (US)

(72) Inventors: Lei Gu, Irvine, CA (US); Zhong Nie, San Mateo, CA (US); Yu Liu, Irvine, CA (US); Xiaogang Wang, Glendora, CA (US)

(73) Assignee: Karma Automotive LLC, Irvine, CA (US)

(*) Notice: Subject to any disclaimer, the term of this patent is extended or adjusted under 35 U.S.C. 154(b) by 161 days.

(21) Appl. No.: 15/459,987

(22) Filed: Mar. 15, 2017

(65) Prior Publication Data
US 2018/0269749 A1 Sep. 20, 2018

(51) Int. Cl.
*H02K 9/19* (2006.01)
*H02K 9/18* (2006.01)
*H02K 5/22* (2006.01)

(52) U.S. Cl.
CPC ............ *H02K 9/19* (2013.01); *H02K 5/225* (2013.01); *H02K 9/18* (2013.01)

(58) Field of Classification Search
CPC ............ H02K 5/20; H02K 5/225; H02K 5/24; H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/24; H02K 11/33; H02K 7/006; H02K 15/0068; H02K 2203/09; H02K 15/14

USPC ..... 310/68 R, 89, 51, 52, 53, 54, 55, 57, 58, 310/59, 60 R, 61, 62, 63, 60 A, 64, 71
See application file for complete search history.

(56) References Cited

U.S. PATENT DOCUMENTS

| 4,938,280 | A | * | 7/1990 | Clark | .................... H01L 23/427 165/80.4 |
| 5,491,370 | A | * | 2/1996 | Schneider | .............. H02K 7/006 310/54 |
| 6,166,937 | A | | 12/2000 | Yamamura | |
| 8,520,386 | B2 | | 8/2013 | Bott | |
| 8,780,557 | B2 | | 7/2014 | Duppong | |
| 9,241,428 | B1 | | 1/2016 | Doo | |
| 2009/0161301 | A1 | | 6/2009 | Woody | |
| 2013/0039009 | A1 | | 2/2013 | Shin | |
| 2016/0064881 | A1 | * | 3/2016 | Yanniello | ................. H02B 1/56 439/207 |
| 2016/0285335 | A1 | * | 9/2016 | Watanabe | .............. H02K 3/522 |

* cited by examiner

FOREIGN PATENT DOCUMENTS

WO WO-2015087567 A1 * 6/2015 ............ H02K 3/522

*Primary Examiner* — Alfonso Perez Borroto
*Assistant Examiner* — Alexander A Singh
(74) *Attorney, Agent, or Firm* — Gordon Rees Scully Mansukhani, LLP

(57) ABSTRACT

An electrical machine includes an electric motor, a cooling jacket over the electric motor, and a power inverter having multiple AC power outlets. The electrical machine also includes an elongated busbar having an end adjacent to and coupled to an AC power outlet. The other end of the elongated busbar is adjacent to and coupled to the electric motor. The elongated busbar traverses from one end of the electric motor to a second end of the electric motor over, and in thermal contact with, the cooling jacket so as to reduce a high temperature at the electric motor to a low temperature at the AC power outlet.

17 Claims, 5 Drawing Sheets

ELECTRICAL MACHINE WITH COOLED BUSBARS

BACKGROUND

The efficient delivery of electrical power for use in driving an electric motor is of ever increasing importance as the transition from fossil fuel based vehicle technologies to green vehicle technologies continues. Electric and electric hybrid vehicles, for example, typically utilize one or more power inverters to convert DC power received from a battery to AC power for use by electric motors to propel the vehicle. One technical challenge posed by interfacing a power inverter with an electric motor is that the operating temperatures routinely generated by the electric motor can damage the heat sensitive transistors in the power inverter.

One conventional approach for transferring AC power to an electric motor utilizes relatively long, flexible cables to connect the AC outputs of the power inverter to the electric motor. Although such a conventional approach offers thermal protection to the power inverter by distancing it from the electric motor, a significant disadvantage of the approach is the amount of space required for its implementation. As demand for electric and hybrid vehicles continues to grow, the need for a more compact solution for interfacing a power inverter with an electric motor that concurrently provides thermal protection for the power inverter becomes increasingly important.

SUMMARY

The present disclosure is directed to electrical machines with cooled busbars, substantially as shown in and/or described in connection with at least one of the figures, and as set forth more completely in the claims.

DETAILED DESCRIPTION

Figure 1:
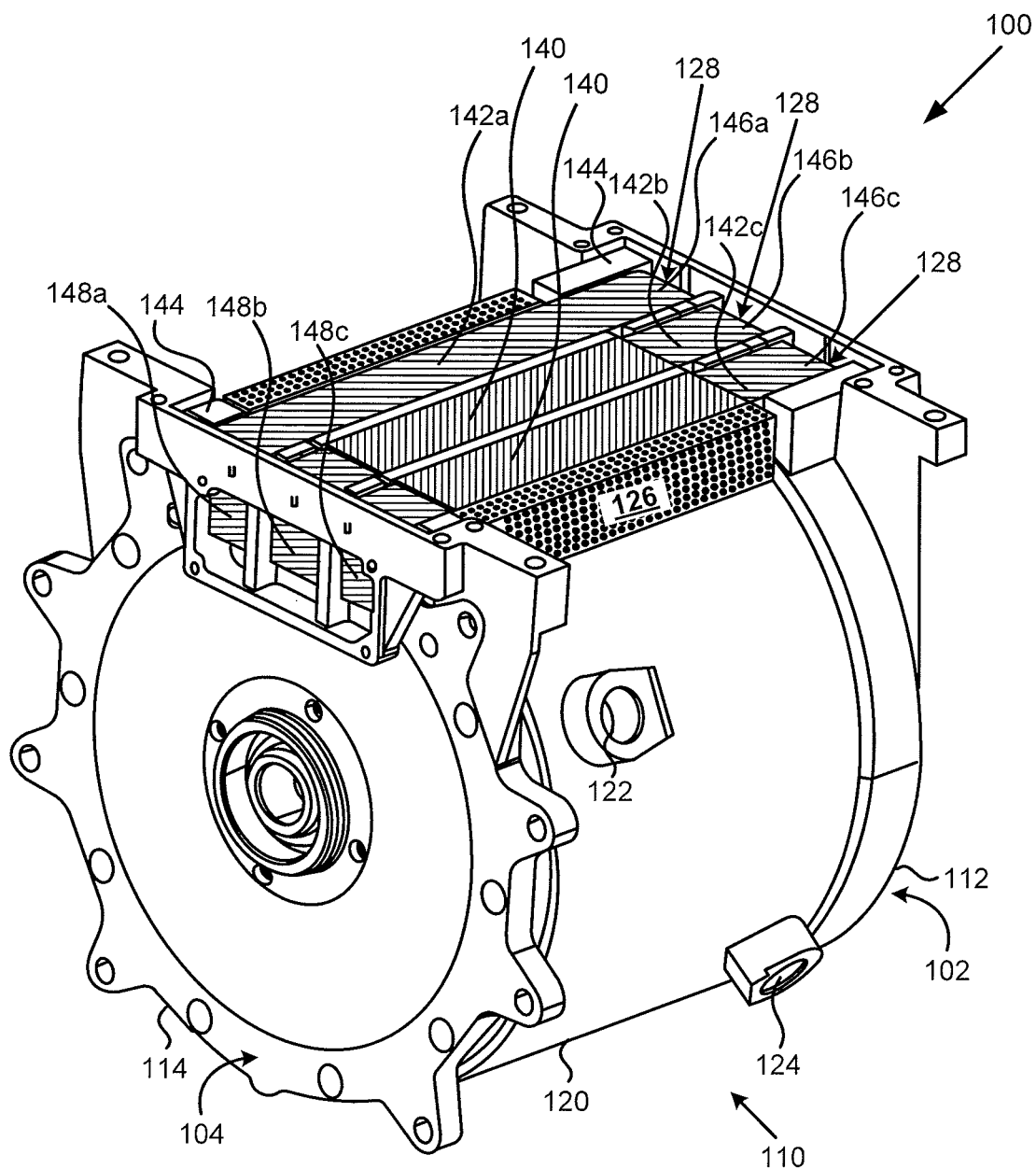
FIG. 1 shows a perspective view of an exemplary electrical machine, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the efficient delivery of electrical power for use in driving an electric motor is of ever increasing importance as the transition from fossil fuel based vehicle technologies to green vehicle technologies continues. As further stated above, as demand for electric and hybrid vehicles continues to grow, the need for a more compact solution for interfacing a power inverter with an electric motor that concurrently provides thermal protection for the power inverter becomes increasingly important.

The present application addresses the electrical power delivery challenges described above by disclosing an efficient, compact, and low cost solution for interfacing an electric motor with a power inverter. By enabling a substantially direct connection between the AC outputs of a power inverter and the electric motor receiving the AC power, the present solution advantageously eliminates the cost and space requirements imposed by the conventional use of cables for accommodating a power inverter/motor interface. Moreover, by effectively cooling the high current carrying conductors connecting the power inverter to the motor, the present solution provides robust thermal protection for the transistors used to implement the power inverter.

FIG. 1 shows a perspective view of exemplary electrical machine 100. According to the exemplary implementation shown in FIG. 1, electrical machine 100 includes electric motor 110 having first motor endcap 112 adjacent first end 102 of electric motor 110, and second motor endcap 114 adjacent second end 104 of electric motor 110. As further shown in FIG. 1, electric motor 110 has cooling jacket 120 situated thereover. Cooling jacket 120 includes coolant inlet 122, coolant outlet 124, and at least one cooling channel (not visible from the perspective of FIG. 1) for cooling electric motor 110. In addition, cooling jacket 120 includes heat sink 126 having three conduct slots 128 thereon.

Also shown in FIG. 1 are non-conductive blocks 144 adjacent first end 102 and second end 104 of electric motor 110 and electrical insulation layer 140. Electrical machine 100 may be implemented as part of a power train of an electric or hybrid electric vehicle, for example. Thus, electric motor 110 may be a traction motor for driving a wheel axle of such a vehicle.

As shown in FIG. 1 each of elongated busbars 142a, 142b, and 142c has a first end adjacent first end 102 of electric motor 110, and a second end adjacent second end 104 of electric motor 110. In other words, elongated busbar 142a has first end 146a and second end 148a, while elongated busbars 142b and 142c have respective first ends 146b and 146c, and respective second ends 148b, and 148c.

Despite being referred to as "busbars" in the present application, elongated busbars 142a, 142b, and 142c may take any of several different forms. For example, although as shown in FIG. 1, elongated busbars 142a, 142b, and 142c may take the form of rectangular electrically conductive bars, in other implementations, elongated busbars 142a, 142b, and 142c may be cylindrical, such as electrically conductive rods. Moreover, in yet other implementations, elongated busbars 142a, 142b, and 142c may be triangular busbars, or may be curved between their respective first and second ends, such as by being implemented as spiral busbars, for example.

Elongated busbars 142a, 142b, and 142c may be implemented using any suitable materials. For example, in the exemplary electric or hybrid electric vehicle implementation described above, elongated busbars 142a, 142b, and 142c may include a metal such as copper, or a first metal coated with a second metal, such as copper coated with tin. Moreover, in that implementation, elongated busbars 142a, 142b, and 142c may have a length, i.e., the distance between their respective first and second ends, of approximately two hundred millimeters (200 mm), and a width of approximately 22 mm, for example.

According to the exemplary implementation shown in FIG. 1, each of elongated busbars 142a, 142b, and 142c is situated in a respective conduct slot 128 of cooling jacket 120, and is mechanically supported at its respective first and second ends by non-conductive blocks 144, which may be plastic blocks, for example. In addition, each of second ends 148a, 148b, and 148c of respective elongated busbars 142a, 142b, and 142c is adjacent to and coupled to one phase of an end winding of electric motor 110 (end windings not visible from the perspective of FIG. 1).

As further shown in FIG. 1, elongated busbars 142a, 142b, and 142c may be partially wrapped by electrical insulation layer 140, which may be any electrically insulating but thermally conductive material, and may be implemented as a paper layer, such as a Nomex® paper layer, for example. It is noted that in FIG. 1, electrical insulation layer 140 underlies each of elongated busbars 142a, 142b, and 142c in its respective conduct slot 128 of cooling jacket 120. In other words, electrical insulation layer 140 is situated between each of elongated busbars 142a, 142b, and 142c and cooling jacket 120.

It is noted that, during operation, electric motor 110 generates substantial heat. Cooling jacket 120 is situated over electric motor 110 and provides cooling for electric motor 110. Cooling jacket 120 may receive a flow of coolant, such as water or any suitable cooling fluid or fluid mix for example, through coolant inlet 122, may circulate the coolant over surface portions of electric motor 110, and may expel the heated coolant through coolant outlet 124.

Despite the cooling provided to electric motor 110 by cooling jacket 120, the end windings of electric motor 110 may reach a temperature of between approximately 150-160° C. during routine operation of electric motor 110. Moreover, because each of second ends 148a, 148b, and 148c of respective elongated busbars 142a, 142b, and 142c is coupled to an end winding of electric motor 110 adjacent second end 104 of electric motor 110, second ends 148a, 148b, and 148c of respective elongated busbars 142a, 142b, and 142c too may be at or near a temperature of 150° C.

According to the exemplary implementation shown in FIG. 1, elongated busbars 142a, 142b, and 142c traverse electric motor 110 from first end 102 to second end 104, over, and in thermal contact with, cooling jacket 120. Cooling jacket 120, including heat sink 126 and conduct slots 128, removes heat from and thereby cools elongated busbars 142a, 142b, and 142c between second end 104 and first end 102 of electric motor 110. Consequently, elongated busbars 142a, 142b, and 142c reduce a high temperature at second ends 148a, 148b, and 148c of respective elongated busbars 142a, 142b, and 142c to a low temperature at first ends 146a, 146b, and 146c of respective elongated busbars 142a, 142b, and 142c.

Figure 2:
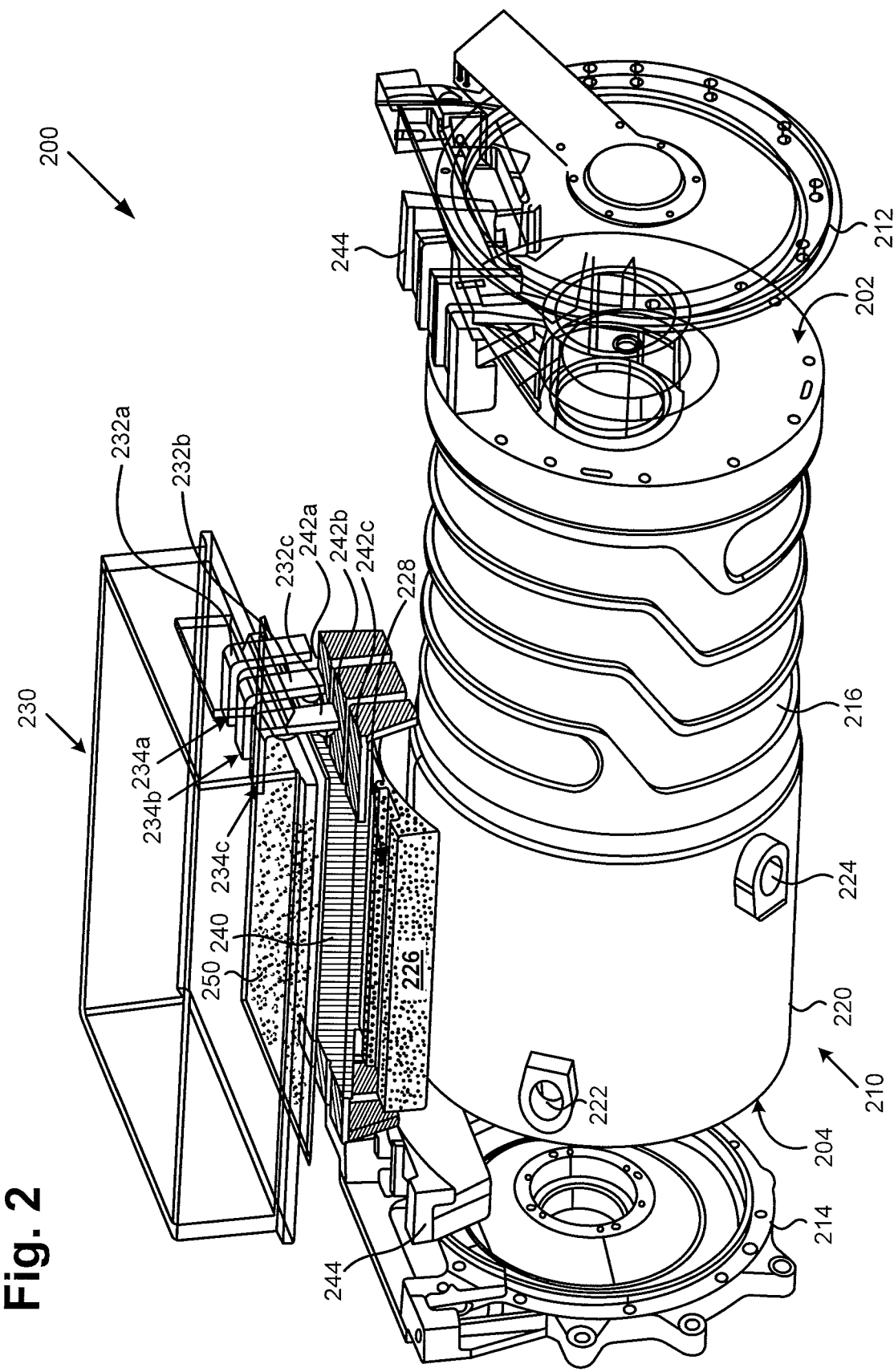
FIG. 2 shows an exploded view of an exemplary electrical machine with a power inverter, according to one implementation.

FIG. 2 shows an exploded view of exemplary electrical machine 200 with power inverter 230, according to one implementation. As shown in FIG. 2, electrical machine 200 includes electric motor 210, and power inverter 230 interfaced with electric motor 210 by inverter busbars 232a, 232b, and 232c, and respective elongated busbars 242a, 242b, and 242c.

According to the exemplary implementation shown in FIG. 2, electric motor 210 includes first motor endcap 212 adjacent first end 202 of electric motor 210, and second motor endcap 214 adjacent second end 204 of electric motor 210. As further shown in FIG. 2, electric motor 210 has cooling jacket 220 including coolant inlet 222, coolant outlet 224, and at least one cooling channel 216 for cooling electric motor 210. In addition, cooling jacket 220 includes heat sink 226 having three conduct slots 228 thereon. Also shown in FIG. 2 are non-conductive blocks 244 adjacent first end 202 and second end 204 of electric motor 210, electrical insulation layer 240, thermally conductive cover 250 situated over elongated busbars 242a, 242b, and 242c, and AC power outlets 234a, 234b, and 234c of power inverter 230.

Non-conductive blocks 244 and electrical insulation layer 240 correspond in general to non-conductive blocks 144 and electrical insulation layer 140 in FIG. 1, and each of those corresponding features may share any of the characteristics attributed to either corresponding feature in the present disclosure. Also, electric motor 210, cooling jacket 220, elongated busbars 242a, 242b, and 242c, and conduct slots 228 correspond respectively in general to electric motor 110, cooling jacket 120, elongated busbars 142a, 142b, and 142c, and conduct slots 128 in FIG. 1, and each of those corresponding features may share any of the characteristics attributed to either corresponding feature in the present disclosure. That is to say, each of elongated busbars 242a, 242b, and 242c is situated in a respective conduct slot 228 on heat sink 226 of cooling jacket 220.

Electrical machine 200 may be implemented as part of a power train of an electric or hybrid electric vehicle, for example. Thus, electric motor 110/210 may be a traction motor for driving a wheel axle of such a vehicle. In such an implementation, power inverter 230 may be used to receive DC power from a battery of the vehicle, to convert the DC power to AC power, and to output the AC power to electric motor 110/210 via AC power outlets 234a, 234b, and 234c connected respectively to inverter busbars 232a, 232b, and 232c. As a specific example, power inverter 230 may provide an AC output at AC power outlets 234a, 234b, and 234c having an output voltage of about three hundred and fifty volts (350V), and an output current of about three hundred and eighty amperes (380 A). More generally, however, the inventive principles disclosed herein may be implemented in high power transfer applications, such as megawatt (MW) power transfer applications, for example.

In some implementations, power inverter 230 may utilize an array of power switches, such as insulated-gate bipolar transistors (IGBTs) for example, to convert a DC input to AC power for delivery to electric motor 110/210. As noted above, during operation, electric motor 110/210 generates substantial heat. Despite the cooling provided to electric motor 110/210 by cooling jacket 120/220, the end windings of electric motor 110/210 (end windings not visible from the perspective of FIG. 1) may reach a temperature of between approximately 150-160° C. during routine operation of electric motor 110.

Moreover, because each of elongated busbars 142a/242a, 142b/242b, and 142c/242c is coupled to one phase of an end winding of electric motor 110/210 adjacent second end 104/204 of electric motor 110/210, those elongated busbars too may be at or near a temperature of 150° C. at their respective second ends 148a, 148b, and 148c. However, the IGBTs or other power switches utilized to implement power inverter 230 may experience thermal damage and/or failure at temperatures substantially lower than 150° C., such as at a temperature of approximately 110° C.

Elongated busbars 142a/242a, 142b/242b, and 142c/242c traverse electric motor 110/210 from first end 102/202 to second end 104/204, over, and in thermal contact with, cooling jacket 120/220. Cooling jacket 120/220, including heat sink 126/226 and conduct slots 128/228, removes heat from and thereby cools elongated busbars 142a/242a, 142b/242b, and 142c/242c between second end 104/204 and first end 102/202 of electric motor 110/210. Additional cooling of elongated busbars 142a/242a, 142b/242b, and 142c/242c between second end 104/204 and first end 102/202 of electric motor 110/210 may be provided by thermally conductive cover 250 situated over elongated busbars 142a/242a, 142b/242b, and 142c/242c. Consequently, elongated busbars 142a/242a, 142b/242b, and 142c/242c reduce a high temperature at the motor end windings adjacent second end 104/204 of electric motor 110/210 to a low temperature at AC power outlets 234a, 234b, and 234c of power inverter 230 adjacent first end 102/202 of electric motor 110/210.

Figure 3:
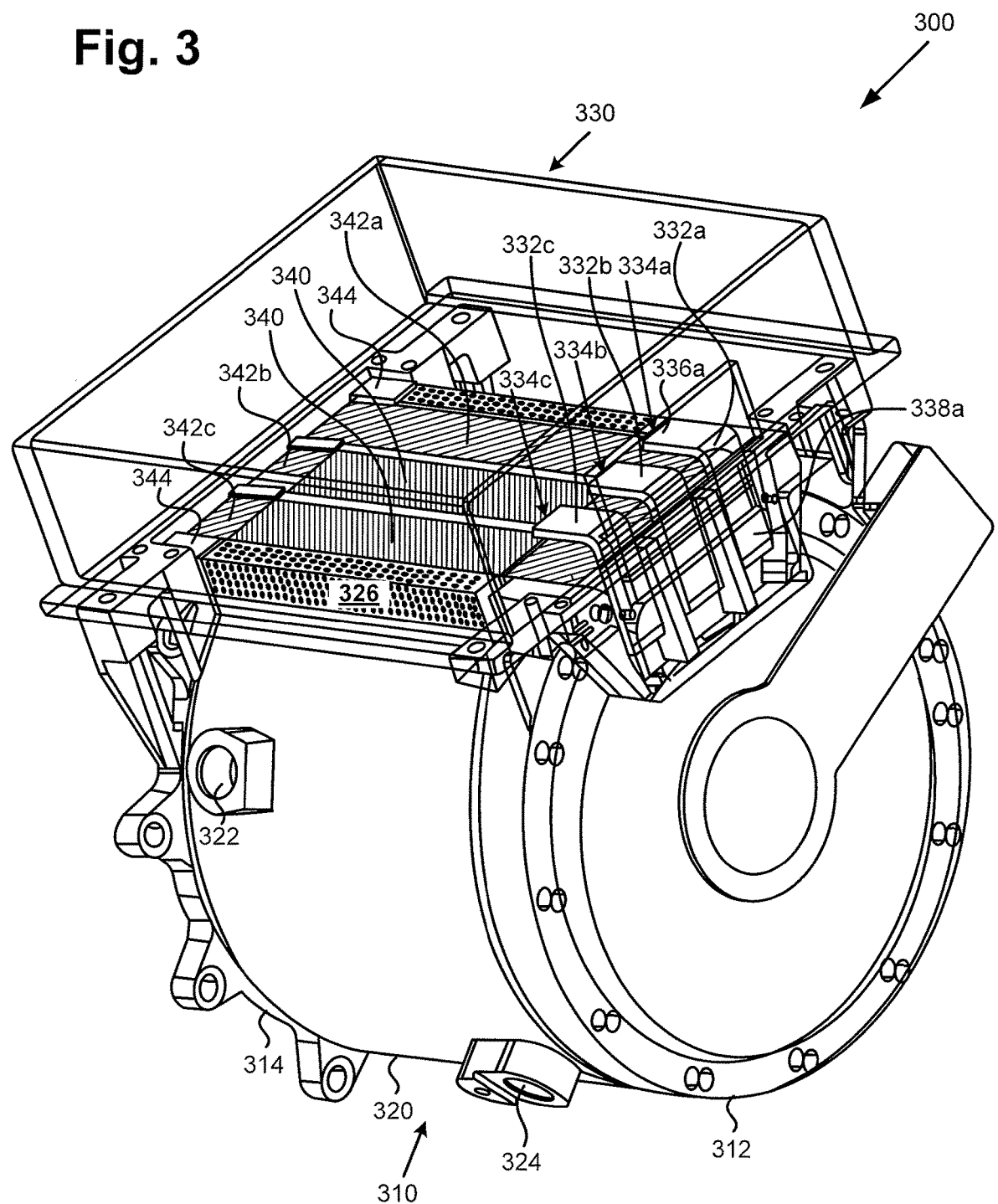
FIG. 3 shows an unexploded view of the exemplary electrical machine with a power inverter shown in FIG. 2.

FIG. 3 shows an unexploded perspective view of an exemplary electrical machine 300 with power inverter 330, according to one exemplary implementation. Electrical machine 300 includes electric motor 310, and power inverter 330 interfaced with electric motor 310 by inverter busbars 332a, 332b, and 332c and respective elongated busbars 342a, 342b, and 342c. As shown in FIG. 3, electric motor 310 has first motor endcap 312 and second motor endcap 314, and includes cooling jacket 320 thereover. Cooling jacket 320 includes coolant inlet 322, coolant outlet 324, and heat sink 326. Also shown in FIG. 3 are non-conductive blocks 344, electrical insulation layer 340, and AC power outlets 334a, 334b, and 334c of power inverter 330.

Electric motor 310, cooling jacket 320, inverter busbars 332a, 332b, and 332c, and elongated busbars 342a, 342b, and 342c correspond respectively in general to electric motor 110/210, cooling jacket 120/220, inverter busbars 232a, 232b, and 232c and elongated busbars 142a/242a, 142b/242b, and 142c/242c, in FIGS. 1 and/or 2, and each of those corresponding features may share the characteristics attributed to any corresponding feature in the present disclosure. That is to say, like electric motor 110/210, electric motor 310, in FIG. 3, has first end 102/202 adjacent first motor endcap 312, second end 104/204 adjacent second motor endcap 314.

Analogously, in addition to coolant inlet 322, coolant outlet 324, and heat sink 326, cooling jacket 320 includes one or more cooling channels corresponding to cooling channel 216, in FIG. 2. Furthermore, like cooling jacket 120/220, cooling jacket 320 includes multiple conduct slots such as conduct slots 128/228. In addition, electrical insulation layer 340 and non-conductive blocks 344 correspond respectively in general to electrical insulation layer 140/240 and non-conductive blocks 144/244, in FIGS. 1 and 2, and each of those corresponding features may share the characteristics attributed to any corresponding feature in the present disclosure. Thus, non-conductive blocks 344 may be plastic blocks, and electrical insulation layer 340 may be an electrically insulating but thermally conductive paper layer, such as a Nomex® paper layer, for example.

Power inverter 330 including AC power outlets 334a, 334b, and 334c corresponds in general to power inverter 230 including AC power outlets 234a, 234b, and 234c, in FIG. 2, and each of those corresponding features may share any of the characteristics attributed to either corresponding feature in the present disclosure. That is to say, power inverter 330 may utilize an array of power switches, such as IGBTs for example, to convert a DC input to AC power for delivery to electric motor 310 via AC power outlets 334a, 334b, and 334c. It is noted that electrical machine 300 is depicted in FIG. 3 as though seen through power inverter 330 and as though seen through a thermally conductive cover corresponding to thermally conductive cover 250, in FIG. 2.

Inverter busbars 232a/332a, 232b/332b, and 232c/332c may assume any of a variety of forms, and may be implemented using any materials and having any dimensions suitable to support the AC power delivered to electric motor 310 via AC power outlets 234a/334a, 234b/334b, and 234c/334c. Each of inverter busbars 232a/332a, 232b/332b, and 232c/332c has a first end adjacent to and connected to a respective one of AC power outlets 234a/334a, 234b/334b, and 234c/334c, and a second end adjacent to and coupled to a first end of a respective one of elongated busbars 142a/242a/342a, 142b/242b/342b, and 142c/242c/342c. In other words, inverter busbar 232a/332a has first end 336a adjacent to and connected to AC power outlet 234a/334a, and second end 338a adjacent to and connected to first end 146a/346a of elongated busbar 142a/242a/342a. Inverter busbars 232b/332b and 232c/332c are similarly connected to respective AC power outlets 234b/334b and 234c/334c of power inverter 130/330 at their own respective first ends, and similarly have their second ends adjacent to and connected to the first ends of respective elongated busbars 142b/242b/342b, and 142c/242c/342c.

Figure 4:
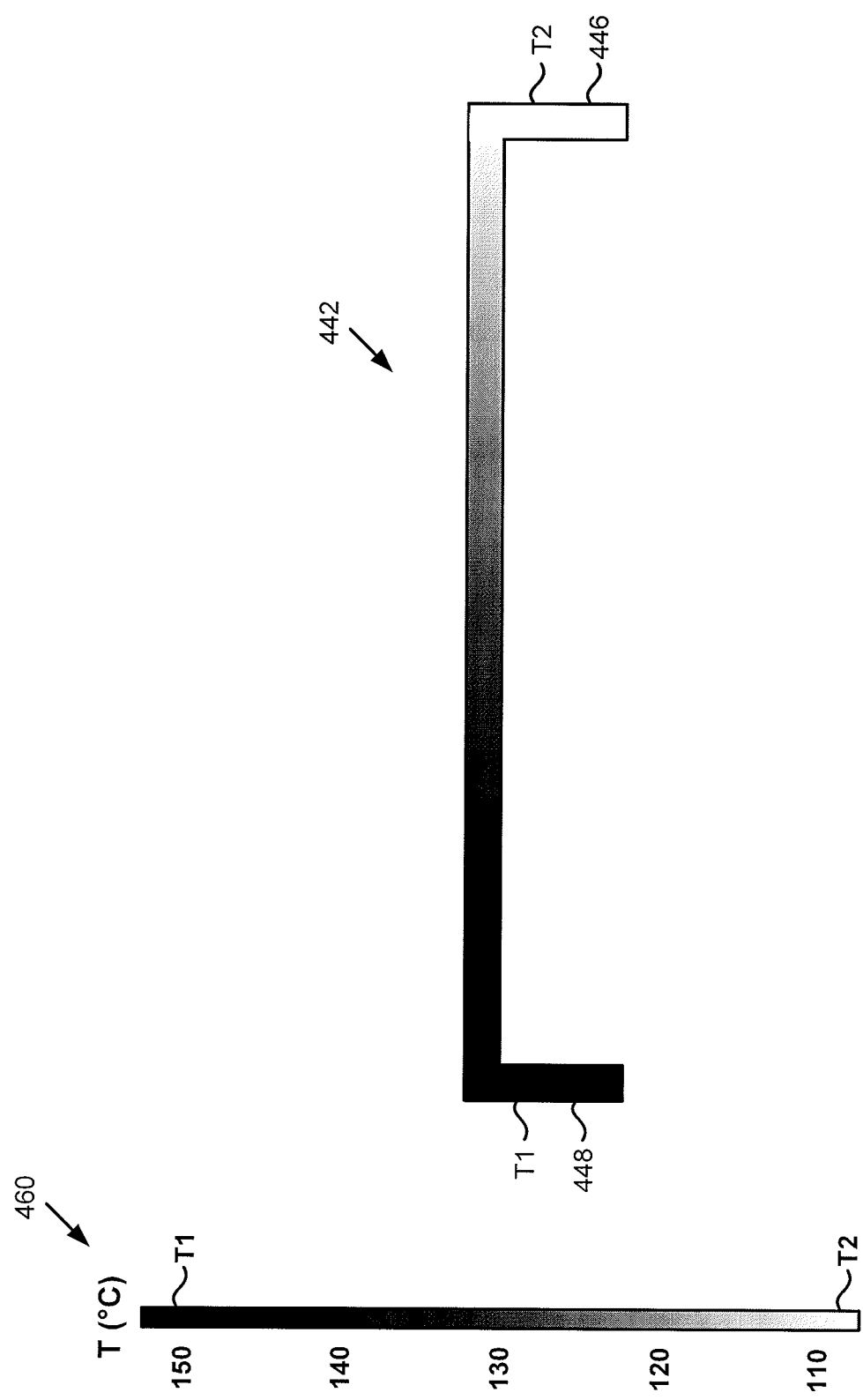
FIG. 4 shows an exemplary temperature gradient of an elongated busbar used as part of an electrical machine with a power inverter, according to one implementation.

FIG. 4 shows an exemplary temperature gradient of elongated busbar 442 when used as part of an electrical machine with a power inverter, according to one implementation. As shown in FIG. 4, elongated busbar 442 has first end 446 and opposite second end 448. Also shown in FIG. 4 is shading indexed temperature key 460 corresponding to temperatures measurable along a length of elongated busbar 442 between second end 448 and first end 446.

Elongated busbar 442 corresponds in general to any of elongated busbars 142a/242a/342a, 142b/242b/342b, and 142c/242c/342c, in FIGS. 1, 2, and 3, and each of those corresponding features may share the characteristics attributed to any corresponding feature in the present disclosure. That is to say, in operation, elongated busbar 442 is implemented so as to have first end 446 adjacent to and connected to a second end of any of inverter busbars 232a/332a, 232b/332b, or 232c/332c, and so as to have second end 448 adjacent to and coupled to one phase of an end winding of electric motor 110/210/310 adjacent second end 104/204 of electric motor 110/210/310.

As noted above, despite the cooling provided to electric motor 110/210/310 by cooling jacket 120/220/320, the end windings of electric motor 110/210/310 may reach a temperature of between approximately 150-160° C. during routine operation of electric motor 110/210/310. In addition, and due to its vicinity to and coupling to an end winding of electric motor 110/220/310, second end 448 of elongated busbar 442 may also be at or near a temperature of 150° C. However, and as further noted above, the IGBTs or other power switches used to implement power inverter 130/330 may experience thermal damage and/or failure at temperatures substantially lower than 150° C., such as at a temperature of approximately 110° C.

Due to its traversal of electric motor 110/210/310 from first end 102/202 to second end 104/204, over, and in thermal contact with, cooling jacket 120/220/320, elongated busbar 442 is cooled between second end 448 and first end 446. Additional cooling of elongated busbar 442 between second end 448 and first end 446 may be provided by thermally conductive cover 250 situated over elongated busbar 442 (i.e. any of elongated busbars 142a/242a/342a, 142b/242b/342b, and 142c/242c/342c). Consequently, elongated busbar 442 has a high temperature T1 at second end 448, and a low temperature T2 at first end 446.

Moreover, the low temperature T2 at first end 446, which is thermally coupled to AC power outlets 234a/334a, 234b/

334*b*, 234*c*/334*c* via respective inverter busbars 232*a*/332*a*, 232*b*/332*b*, 232*c*/332*c* is sufficiently low to prevent thermal damage to power switching module 456. In other words, low temperature T2 at first end 446 of elongated busbar 442 can be less than approximately 110° C. Thus AC power outlets 234*a*/334*a*, 234*b*/334*b*, 234*c*/334*c* of power inverter 130/330 are effectively cooled despite being interfaced with electric motor 110/210/310.

Figure 5:
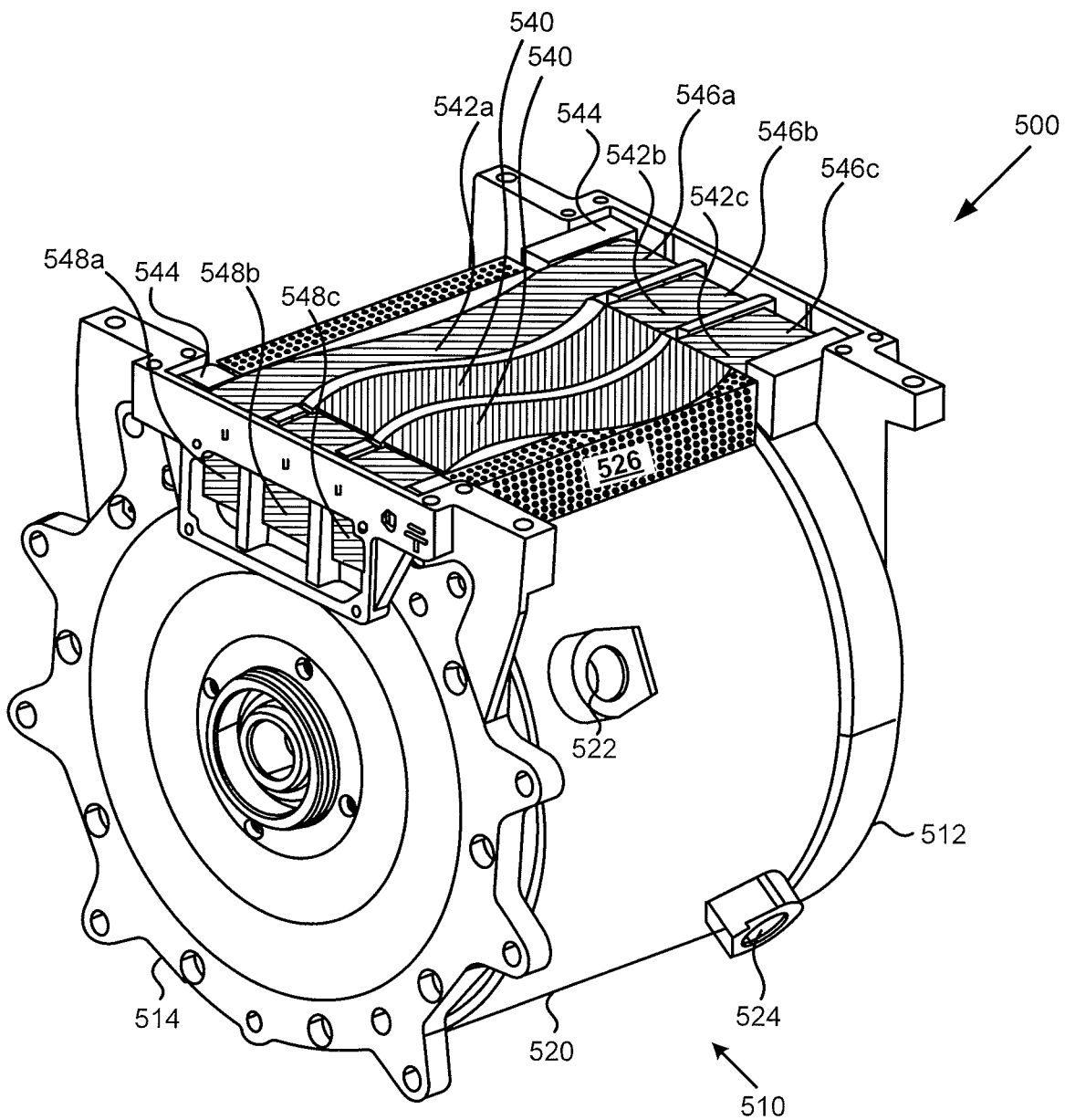
FIG. 5 shows an electrical machine, according to another exemplary implementation.

FIG. 5 shows electrical machine 500, according to another exemplary implementation. As shown in FIG. 5, electrical machine 500 includes electric motor 510 having first motor endcap 512 and second motor endcap 514, cooling jacket 520 having coolant inlet 522, coolant outlet 524, and heat sink 526, and elongated busbars 542*a*, 542*b*, and 542*c*. In addition, electrical machine 500 includes non-conductive blocks 544 and electrical insulation layer 540. According to the exemplary implementation shown in FIG. 5, elongated busbars 542*a*, 542*b*, and 542*c* include one or more curves between their respective first and second ends. Moreover, in some implementations, elongated busbars 542*a*, 542*b*, and 542*c* may take the form of spiral busbars, for example.

Electric motor 510 and cooling jacket 520 correspond respectively in general to electric motor 110/210/310 and cooling jacket 120/220/320, in FIGS. 1 2 and 3, and each of those corresponding features may share the characteristics attributed to any corresponding feature in the present disclosure. That is to say, like electric motor 110/210/310, electric motor 510 has first end 102/202 adjacent first motor endcap 512, second end 104/204 adjacent second motor endcap 514, and end windings coupled to second ends 548*a*, 548*b*, and 548*c* of respective elongated busbars 542*a*, 542*b*, and 542*c* adjacent second end 104/204 of electric motor 510.

Analogously, in addition to coolant inlet 522, coolant outlet 524, and heat sink 526, cooling jacket 520 includes one or more cooling channels corresponding to cooling channel 216, in FIG. 2. Furthermore, like cooling jacket 120/220, cooling jacket 520 includes multiple conduct slots 128/228. It is noted that, according to the exemplary implementation shown in FIG. 5, each of elongated busbars 542*a*, 542*b*, and 542*c* is situated in a respective conduct slot on heat sink 526 of cooling jacket 520. It is further noted that electrical machine 500 is depicted in FIG. 5 as though seen through a thermally conductive cover corresponding to thermally conductive cover 250, in FIG. 2.

As further shown in FIG. 5, each of elongated busbars 542*a*, 542*b*, and 542*c* has a first end adjacent the first end of electric motor 510, and a second end adjacent the second end of electric motor 510. In other words, elongated busbar 542*a* has first end 546*a* and second end 548*a*, while elongated busbars 542*b* and 542*c* have respective first ends 546*b* and 546*c*, and respective second ends 548*b*, and 548*c*. As shown in FIG. 5, according to the present exemplary implementation, elongated busbars 542*a*, 542*b*, and 542*c* may take the form of curved busbars.

Elongated busbars 542*a*, 542*b*, and 542*c* may be implemented using any materials, and having any dimensions, suitable to support the AC power delivered to electric motor 510 by a power inverter corresponding to power inverter 230/330, in FIGS. 2 and 3. For example, in the exemplary electric or hybrid electric vehicle implementation described above, elongated busbars 542*a*, 542*b*, and 542*c* may include a metal such as copper, or a first metal coated with a second metal, such as copper coated with tin. Moreover, in that implementation, elongated busbars 542*a*, 542*b*, and 542*c* may have a length, i.e., the distance between their respective first and second ends, of less than approximately 200 mm, and/or a width of less than approximately 22 mm, for example.

According to the exemplary implementation shown in FIG. 5, each of elongated busbars 542*a*, 542*b*, and 542*c* is situated in a conduct slot of cooling jacket 620 corresponding to conduct slots 128 and 228, in FIGS. 1 and 2, and is mechanically supported at its respective first and second ends by non-conductive blocks 544, which may be plastic blocks, for example. As further shown in FIG. 5, each of elongated busbars 542*a*, 542*b*, and 542*c* may be partially wrapped by electrical insulation layer 540, which may be any electrically insulating but thermally conductive material, and may be implemented as a paper layer, such as a Nomex® paper layer, for example. It is noted that in FIG. 5, electrical insulation layer 540 underlies each of elongated busbars 542*a*, 542*b*, and 542*c* in its respective conduct slot of cooling jacket 520. In other words, electrical insulation layer 540 is situated between each of elongated busbars 542*a*, 542*b*, and 542*c* and cooling jacket 520.

Due to their respective traversals of electric motor 510 from first end 102/204 to second end 104/204, over, and in thermal contact with, cooling jacket 520, elongated busbars 542*a*, 542*b*, and 542*c* are cooled between their respective second ends 548*a*, 548*b*, and 548*c* and their respective first ends 546*a*, 546*b*, and 546*c*. Additional cooling of busbars 542*a*, 542*b*, and 542*c* between their respective second and first ends may be provided by thermally conductive cover 250 situated over elongated busbars 542*a*, 542*b*, and 542*c*. Consequently, and referring to FIG. 4, elongated busbars 542*a*, 542*b*, and 542*c* have a high temperature T1 at their respective second ends 548*a*, 548*b*, and 548*c*, and a low temperature T2 at their respective first ends 546*a*, 546*b*, and 546*c*.

It is noted that the heat dissipation efficiency of elongated busbars 542*a*, 542*b*, and 542*c* is determined by their effective length and width. By implementing elongated busbars 542*a*, 542*b*, and 542*c* as curved or spiral busbars, the effective length of elongated busbars 542*a*, 542*b*, and 542*c* may be increased without increasing the linear distance between first ends 546*a*, 546*b*, and 546*c*, and respective second ends 548*a*, 548*b*, and 548*c*. As a result, considerable design variations are enabled.

For example, elongated busbars 542*a*, 542*b*, and 542*c* may be narrower while still providing the same amount of heat dissipation. Alternatively, elongated busbars 542*a*, 542*b*, and 542*c* can be utilized with a more compact electric motor, i.e., one for which first end 102/202 and second end 104/204 in FIGS. 1 and 2 are more closely situated. As yet another variation, curved or spiral busbars having substantially the same linear length and width as elongated busbar 442, for example, may deliver more AC power while providing adequate heat dissipation.

Thus, the present application discloses an efficient, compact, and low cost solution for interfacing an electric motor with one or more power inverters. By enabling a substantially direct connection between the AC outputs of a power inverter and the electric motor receiving the AC power, the present solution advantageously eliminates the cost and space requirements imposed by the conventional use of cables for mediating an inverter/motor interface. Moreover, by effectively cooling the high current carrying conductors, for example the busbars, connecting the power inverter to the motor, the present solution provides robust thermal protection for the transistors used to implement the power inverter.

It is noted that the inventive electrical machine with cooled busbars disclosed by the present application can advantageously be implemented with a variety of different types of power inverters having different cooling capabilities. Furthermore, the solution for interfacing an electric motor with a power inverter disclosed herein advantageously enables direct connection of the electric motor and the power inverter regardless of the cooling capability of the power inverter. It is further noted that in various implementations of the present disclosure, the various busbars may be flat busbars (rectangular or curved), or cylindrical busbars, such as electrically conductive rods, triangular busbars, or even spiral busbars.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. An electrical machine comprising:
an electric motor;
a cooling jacket over said electric motor;
a power inverter having a plurality of AC power outlets;
an inverter busbar having a first end adjacent to and connected to one of said plurality of AC power outlets, and a second end adjacent to and connected to a first end of an elongated busbar;
a second end of said elongated busbar being adjacent to and coupled to said electric motor, and wherein the power inverter and the inverter busbar are both positioned outside of the cooling jacket;
said elongated busbar traversing from one end of said electric motor to a second end of said electric motor over said, and in thermal contact with said, cooling jacket so as to reduce a high temperature at said electric motor to a low temperature at said one of said plurality of AC power outlets; and
a heat sink located between the cooling jacket and the elongated busbar, wherein the heat sink has a conductive slot into which the elongated busbar is received and the inverter is positioned on one side of the electric motor.

2. The electrical machine of claim 1, wherein said elongated busbar is selected from a group consisting of a rectangular busbar, a triangular busbar, a curved busbar, and a cylindrical busbar.

3. The electrical machine of claim 1, further comprising a thermally conductive cover situated over said elongated busbar.

4. The electrical machine of claim 1, further comprising an electrical insulation layer situated between said elongated busbar and said cooling jacket.

5. The electrical machine of claim 1, wherein said cooling jacket comprises at least one coolant channel, a coolant inlet, and a coolant outlet.

6. An electrical machine comprising:
an electric motor;
a cooling jacket over said electric motor;
a power inverter having a plurality of AC power outlets;
an elongated busbar having a first end coupled to one of said plurality of AC power outlets, and a second end coupled to said electric motor, and wherein the power inverter and the elongated busbar are both positioned outside of the cooling jacket;
said elongated busbar traversing from one end of said electric motor to a second end of said electric motor over said, and in thermal contact with said, cooling jacket; and
a heat sink located between the cooling jacket and the elongated busbar, wherein the heat sink has a conductive slot into which the elongated busbar is received and the inverter is positioned on one side of the electric motor.

7. The electrical machine of claim 6, wherein said elongated busbar is selected from a group consisting of a rectangular busbar, a triangular busbar, a curved busbar, and a cylindrical busbar.

8. The electrical machine of claim 6, further comprising a thermally conductive cover situated over said elongated busbar.

9. The electrical machine of claim 6, further comprising an electrical insulation layer situated between said elongated busbar and said cooling jacket.

10. The electrical machine of claim 6, wherein said cooling jacket comprises at least one coolant channel, a coolant inlet, and a coolant outlet.

11. The electrical machine of claim 6, wherein said elongated busbar has a high temperature at said second end, and a low temperature at said first end.

12. An electrical machine comprising:
an electric motor;
a cooling jacket over said electric motor;
an elongated busbar having a first end configured to be coupled to an AC power outlet, and a second end coupled to said electric motor, and wherein the power inverter and the elongated busbar are both positioned outside of the cooling jacket;
said elongated busbar traversing from one end of said electric motor to a second end of said electric motor over said, and in thermal contact with said, cooling jacket; and
a heat sink located between the cooling jacket and the elongated busbar, wherein the heat sink has a conductive slot into which the elongated busbar is received and the inverter is positioned on one side of the electric motor.

13. The electrical machine of claim 12, wherein said elongated busbar is selected from a group consisting of a rectangular busbar, a triangular busbar, a curved busbar, and a cylindrical busbar.

14. The electrical machine of claim 12, further comprising a thermally conductive cover situated over said elongated busbar.

15. The electrical machine of claim 12, further comprising an electrical insulation layer situated between said elongated busbar and said cooling jacket.

16. The electrical machine of claim 12, wherein said cooling jacket comprises at least one coolant channel, a coolant inlet, and a coolant outlet.

17. The electrical machine of claim 12, wherein said elongated busbar has a high temperature at said second end, and a low temperature at said first end.

* * * * *